March 31, 1925.
A. L. BRIDGHAM
LUBRICATING DEVICE
Filed May 8, 1924
1,531,375
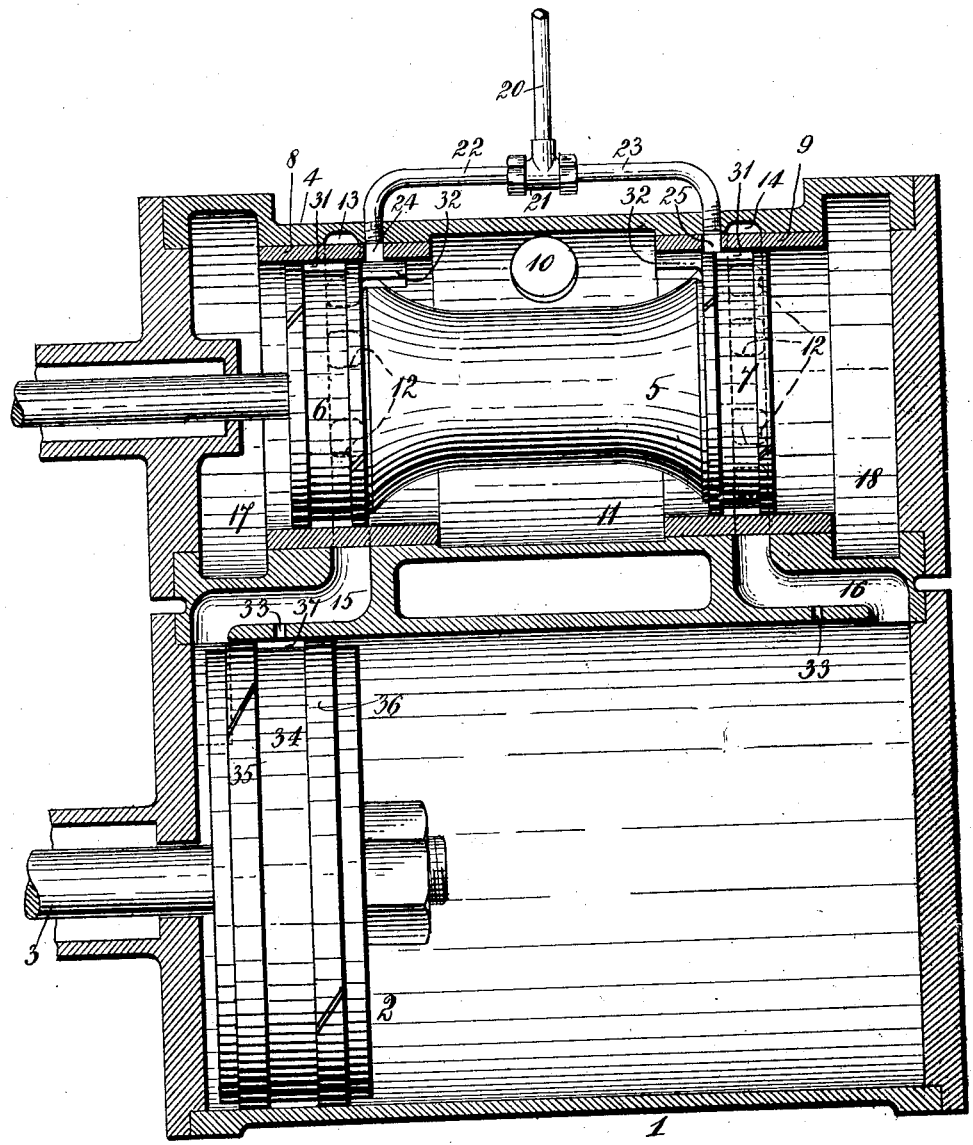
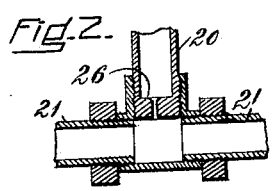
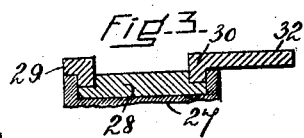
INVENTOR=
Arthur L. Bridgham
By Craig + Hayes
ATTORNEYS Patented Mar. 31, 1925.

1,531,375

UNITED STATES PATENT OFFICE.

ARTHUR L. BRIDGHAM, OF BOSTON, MASSACHUSETTS.

LUBRICATING DEVICE.

Application filed May 8, 1924. Serial No. 711,761.

*To all whom it may concern:*

Be it known that I, ARTHUR L. BRIDGHAM, of Boston, in the county of Suffolk and State of Massachusetts, a citizen of the United States, have invented a new and useful Improvement in Lubricating Devices, of which the following is a full, clear, and exact description, reference being had to the accompanying drawings, forming a part of this specification, in explaining its nature.

The invention relates to a lubricating device and essentially to a device or arrangement for lubricating the joints between parts subjected to high pressure steam.

Among the essential objects of the invention are to provide a steady feed of oil; to apply the oil in such a manner that it will not be injured by the steam; to apply the oil effectively, and to use the steam as a means for atomizing the oil and applying it into the joints or places where lubrication is required.

The invention is shown in the drawings applied to the lubrication of the piston valve and piston of a locomotive to which it is especially applicable and in which only such parts are shown as are necessary to a proper understanding of the invention.

Figure 1 is a view partly in vertical cross section and partly in side elevation of the various parts and applied lubricating device.

Fig. 2 is a section of a detail of construction later to be referred to, and

Fig. 3 is a cross section of a further detail of construction later to be referred to.

Referring to the drawings:—

1 represents the cylinder, 2 the piston and 3 the piston rod.

4 is the casing or chest containing the piston valve 5 which controls the admission of steam to the opposite ends of the cylinder 1. 6 and 7 represent the opposite ends or heads of the piston valve which slide upon annular bearings 8 and 9, respectively, contained within the casing 4. Steam is admitted to the interior of the casing 4 by way of an inlet 10 communicating with a chamber 11 intermediate the opposite ends or heads of the piston valve. Formed within each of the annular bearings 8 and 9 are openings 12 connecting, respectively, with annular passages 13 and 14 formed within the casing outside the annular bearings 8 and 9. The annular passages 13 and 14 connect, respectively, with passages 15 and 16 leading, respectively, to the opposite ends of the cylinder. At the opposite ends of the valve casing 4 beyond the heads of the piston valve are exhaust chambers 17 and 18, respectively, into one or the other of which steam is adapted to exhaust from the cylinder 1 and thence escape in the usual manner.

As the piston valve is reciprocated steam is allowed to pass through the openings 12 in one or the other of the bearings 8 or 9 and thence to the adjacent end of the cylinder for operating the piston 2. As steam is thus admitted to one end of the cylinder it is allowed to exhaust from its opposite end beyond the piston, escaping by way of the openings 12 in the adjacent bearing and thence into the adjacent exhaust chamber at the end of the casing.

The parts thus far mentioned are of common type and function in the usual manner. They are referred to in order to obtain a proper understanding of the invention which pertains essentially to a means for lubricating the joints between the heads or ends 6 and 7 of the piston valve and the bearings 8 and 9 on which these heads slide; also, to means for lubricating the joint between the cylinder 1 and piston 2, and to which means of lubrication attention is now directed.

20 is a pipe leading from a lubricator (not shown). Oil is directed to pass through this pipe from the lubricator under the usual pressure. The pipe 20 is provided at its end with a pipe fitting 21 from which branch pipes 22 and 23 extend. These pipes have threaded connection with the casing 4 and the ends thereof connect, respectively, with passages 24 and 25 extending, respectively, through the bearings 8 and 9. The passages 24 and 25 extend through the bearings at points slightly inwardly removed from the line of openings 12 through the bearings and open into the joints between the bearings and the heads of the piston valve.

The pipe fitting 21 is provided on its interior with a relatively small or pinhole opening 26 through which oil may pass from the pipe 20 into the pipes 22 and 23 (see Fig. 2).

The heads 6 and 7 of the piston valve each comprises an end-supporting bearing 27, surrounding which is the usual bull-ring 28 and packing rings 29 and 30, of which 29 are the outer packing rings and 30 the inner rings. When the valve head is in place engaging its bearing, owing to the slight projection of the packing rings beyond the outer face of the bull-ring, an annular chamber 31 will be formed between the packing rings, and between the bull-ring and the bearing, making an effective depository for oil applied to the joint between the head and bearing for lubricating it. The inner rings 30 have secured to them packing extensions or wings 32 by which the bearing of the respective valve heads are widened at points adjacent the openings 24 and 25 in the bearings 8 and 9 (see Fig. 3).

The operation is as follows: When the piston valve 5 is in its neutral or substantially neutral position within the casing 4 the passages 24 and 25 through the bearing rings 8 and 9 will be covered by the heads of the piston valve or extensions 32 thereto. Oil then directed through the pipe 20 will slowly pass through the pipe fitting 21 into the branch pipes 22 and 23 and thence through the openings 24 and 25 into the joints between the bearing rings 8 and 9 and the heads 6 and 7 of the piston valve lubricating these joints. The same effect will be obtained when the piston valve is being operated with but a slight range of movement for admitting little steam to the cylinder for operating the piston at low speed. At such time oil thus admitted to the respective joints will not pass through the chamber 11 to which high pressure steam is being admitted, but will be admitted directly into the respective joints which are closed by the packing rings 30 on the heads of the piston valve from the chamber 11 to which high pressure steam is being admitted.

Assuming now that a full head of steam is being admitted to the cylinder for operating the piston and that the piston valve is being operated with the full range of movement afforded it and that the piston valve is being moved in the direction of the arrow thereon: When the piston valve moving in the direction thus indicated has reached the limit of its stroke, then the packing wing 32 on the head 6 of the piston valve will have moved outwardly to a point where steam will be admitted to pass by it through the opening 24 in the bearing ring 8. At this same time the opposite end or head 7 of the piston valve will have reached a position where it lies directly in line with the opening 25 in the bearing ring 9. In fact, the opening 25 will then be in direct communication with the annular chamber 31 in the head 7. Immediately upon communication being established between the opening 24 and the chamber 11 of the casing, high pressure steam will pass through the opening 24 and this acting in the manner of an injector, will blow all oil in the pipes 22 and 23 through the opening 25 and into the joint between the bearing 9 and the adjacent head 7 of the piston valve. In other words, the head 7 of the valve will then be subjected to a spray of finely atomized oil which will enter the chamber 31 in the head and fill all crevices therein and thoroughly lubricate the joint between the head and the adjacent bearing. The lubrication of the head of the piston valve and adjacent joint thus obtained is especially effective by reason of the fact that steam is exhausting from the adjacent end 18 of the casing and all parts of the head are under very low pressure. Accordingly, high pressure steam carrying the oil into the head and joint meets with practically no pressure resistance and the oil can be carried to all parts of the head and joint, thoroughly lubricating them under conditions when complete lubrication is most to be desired. Precisely the same operation takes place at the opposite end or head 6 of the piston valve when the valve is moved in a direction reverse to that indicated by the arrow thereon. In such case high pressure steam will be admitted from the chamber 11 to pass by the wing extension 32 on the head 7 of the piston valve and through the opening 25 in the bearing 9 and blow all oil in the pipes 22 and 23 through the opening 24 in the bearing 8 and into the joint between this bearing and the adjacent head 6 of the piston valve thoroughly lubricating this head.

With the heads of the piston valve and the joints between the heads and their respective bearings thus lubricated, a considerable amount of oil will escape from the heads of the piston valve and passing through the openings 12 in the respective bearings 9 and 10, will enter the passages 15 and 16 leading to the chamber of the cylinder 1 for lubricating the piston operating therein. Oil contained in the passages 15 and 16 will be carried into the cylinder by entering steam. In order that some of the oil in the passages 15 and 16 may be carried or blown directly onto the peripheral edge of the piston ports 33 are formed in the wall of the cylinder from the respective passages 15 and 16. The bearing edge of the piston is formed quite similar to the heads of the piston valve and comprises a bull-ring 34 with packing rings 35 and 36 on either side thereof with extension beyond the face of the bull-ring leaving an annular chamber 37 adjacent the interior wall of the cylinder and into this chamber and onto the adjacent edge of the piston oil will be injected through the ports 33 during the operation of the piston.

Having thus fully described my invention, I claim and desire to secure by Letters Patent of the United States:—

1. The combination with a piston valve having separate spaced heads and a casing in which the valve is reciprocable, said casing having on the interior thereof separate spaced bearings for said heads of the valve and between said heads a chamber in which steam is received under pressure, of means for lubricating the respective heads of the valve and their respective bearings comprising connections into which oil is admitted and which connections have separate outlet openings into the joints between the heads of the valve and their respective bearings, said connections and outlets therefrom being arranged whereby steam admitted to the casing will be permitted to enter said outlets and pass through said connections during the reciprocation of the valve and eject oil from said connections into said joints and to the heads of the valve for lubricating said heads and their adjacent bearings.

2. The combination with a piston valve having separate spaced heads and a casing in which the valve is reciprocable, said casing having on the interior thereof separate spaced bearings for said heads of the valve and between said heads a chamber in which steam is received under pressure, of means for lubricating the respective heads of the valve and their respective bearings comprising connections into which oil is admitted extending through said casing and bearings with outlet openings into the joints between the heads of the valve and said bearings, said connections being arranged whereby steam admitted to the casing will be permitted during the reciprocation of the valve to successively enter said connections by way of said outlets and passing through said connections eject oil therefrom into said joints and onto said heads of the valve for lubricating said heads and their adjacent bearings.

3. The combination with a piston valve having separate spaced heads and a casing in which the valve is reciprocable, said casing having on the interior thereof separate spaced bearings for said heads of the valve and between said heads a chamber in which steam is received under pressure, of means for lubricating the respective heads of the valve and their respective bearings comprising a lubricator pipe into which oil is admitted with branch connections extending through said casing and bearings with outlets into the joint between the heads of the valve and said bearings, said pipe being provided with a relatively restricted opening separating the interior thereof from said branch connections, said branch connections and outlets therefrom being so disposed and arranged that steam admitted to said chamber and casing will be permitted to enter said outlets successively as the valve is reciprocated and pass through said branch connections and thereby eject oil contained within said connections into the joints between said heads and their respective bearings for successively lubricating said heads and bearings.

4. In combination, a piston valve having separate spaced heads, a casing in which the valve is reciprocable, said casing having on the interior thereof separate spaced bearings for said heads of the valve and between said heads a chamber in which steam is received under pressure, a lubricator pipe into which oil is received with branch connections having outlets into the joints between said heads and their respective bearings, and means carried by the respective heads to have engagement with said bearings and arranged whereby said means will permit of communication being successively established between said chamber and one or the other of said outlets as the valve is reciprocated.

5. In combination, a reciprocating member, a bearing therefor, a chamber in which fluid is compressed, and means for lubricating the joint between said member and bearing, said means comprising an oil-containing connection with an outlet into the joint between said member and bearing for lubricating the same, and means whereby the fluid pressure in said chamber will intermittently, during the reciprocation of said member, be admitted to said connection for ejecting oil therefrom into said joint for lubricating said member and bearing.

ARTHUR L. BRIDGHAM.